MULTIPLE TIE ROD FASTENER AND MOUNTING BRACKET

Original Filed July 30, 1963 Sheet 1 of 2

INVENTORS
KENNETH C. ALLISON
WILLIAM L. KELVER
BY John J. Gaydos
ATTORNEY

INVENTORS
KENNETH C. ALLISON
WILLIAM L. KELVER
BY John J. Gaydos
ATTORNEY

United States Patent Office 3,433,120
Patented Mar. 18, 1969

3,433,120
MULTIPLE TIE ROD FASTENER AND MOUNTING BRACKET

Kenneth C. Allison, Crystal Lake, Ill., and William L. Kelver, Arden, N.C., assignors to CTS Corporation, Elkhart, Ind., a corporation of Indiana Original application July 30, 1963, Ser. No. 298,742, now Patent No. 3,248,490, dated Apr. 26, 1966. Divided and this application Oct. 19, 1965, Ser. No. 498,032
U.S. Cl. 85—36 2 Claims
Int. Cl. F16b *17/00*

This application is a division of application Ser. No. 298,742, filed July 30, 1963, which issued as Patent No. 3,248,490 on Apr. 26, 1966. The present invention relates to a tie rod fastener and, more particularly, to a multiple tie rod fastener and mounting bracket for rigidly securing a component onto a pair of spaced tie rods.

In the production of electrical components, e.g., a selector switch, a pair of threaded screws extending from a bracket has been employed for stacking a plurality of wafer switch assemblies thereonto. The wafer switch assemblies may be spaced from each other by tubular spacers fitted over the threaded portion of the screw or the wafer switch assemblies may be stacked next to each other. After the proper number of wafer switch assemblies has been stacked onto the spaced pair of threaded screws, a bridge member may be employed for spacing properly the unsecured ends of the tie rods. A nut threadedly engaged onto each of the screws fixedly secures the bridge member and the wafer switch assemblies to the bracket. When the nuts are being threadingly engaged onto the screws, the torque applied to each of the nuts tends to rotate the bridge member of the switch with respect to the bracket and, consequently, the individual wafer switch assemblies become spiraled or twisted. Various complicated fixtures have been employed to avoid spiraling of the wafer switch assemblies, but much reliance is still placed upon human detection. However, as the size of the selector switch and the individual wafer switch assemblies decreases, the size of the bridge members and the tie rods also decreases proportionately. The same mechanical clearances, which are held to a minimum and, therefore, are the same for all switch components, produce greater angular twist as the overall diameter is reduced. Therefore, the tendency for spiraling increases since the operator finds it more difficult to adjust to the assembly clearance to correct the twisting. Further, the angle generated by the decrease in size increases proportionally with a reduction in size of the selector switch. It would, therefore, be desirable to improve the design of certain electrical components, e.g., a selector switch, by employing means for fixedly securing one or more assemblies to the tie rods without causing twisting of the individual assemblies.

In the manufacture of selector switches, a large variety of screw lengths generally is stocked in order that an adequate supply of the proper length screw is always available. By employing unthreaded rods instead of screws, the desired length may be easily obtained by quickly cutting the rod to the proper length and swaging one end thereof to form a head thereon. Moreover, it is well known that a screw or threaded rod has approximately 50 percent the tensile strength of an unthreaded rod of the same diameter. By using unthreaded rods or tie rods for assembling the wafer switch assemblies together, the diameter of the tie rods can be decreased. Such features have not been introduced heretofore since the present type of single or multiple sheet metal fastener available on the market generally is incapable of rigidly holding the wafer switch assemblies of a selector switch in stacked relationship. It would, therefore, also be desirable to provide an improved fastener for rigidly securing one or more assemblies onto a pair of tie rods.

Heretofore, the practice had been to secure a separate mounting bracket onto the ends of the threaded screws for mounting various electrical components, e.g., a variable resistor, onto the end of a selector switch. It would, therefore, also be desirable to provide a multiple tie rod fastener with mounting means, the electrical component being secured to the central portion of the multiple tie rod fastener. The shaft employed for rotating the rotors of the wafer switch assemblies may extend through an aperture in the fastener and into cooperation with the electrical component for controlling the same.

Various types of multiple sheet metal fasteners are currently available on the market. None of these fasteners, however, incorporates means for increasing the force for maintaining a component fixedly secured on a pair of tie rods. By utilizing the resiliency of a central member integrally joining a pair of fasteners together and by preforming the fasteners of a multiple tie rod fastener at an angle to the central member, the holding action of the fasteners against the component or assembly secured on the pair of tie rods is increased considerably. It would, therefore, also be desirable to provide such a multiple tie rod fastener wherein the fasteners are disposed at an angle to the central member and integrally secured thereto.

Accordingly, it is an object of the present invention to provide an improved fastening means for a selector switch.

Another object of the present invention is to provide an improved selector switch wherein the wafer switch assemblies are properly aligned with respect to each other.

An additional object of the present invention is to provide an improved multiple tie rod fastener for firmly securing a component onto a pair of tie rods.

A further object of the present invention is to provide a combination multiple tie rod fastener and mounting bracket.

A still further object of the present invention is to provide a multiple tie rod fastener having the securing members thereof disposed at an angle to the central portion thereof, the securing members each being provided with a plurality of teeth for gripping a pair of tie rods wherein the teeth are urged into biting engagement with each of the tie rods by the central portion of the fastener bridging the tie rods together.

Yet another object of the present invention is to provide a multiple tie rod fastener for fixedly securing a plurality of wafer switch assemblies onto a pair of tie rods whereby rotation of the tie rods disassembles the fastener from the tie rods by generating a spiral on the tie rods.

Further objects and advantages of the present invention will become apparent as the following description proceeds, and the features of novelty which characterize the invention will be pointed out with particularity in the claims annexed to and forming a part of this specification.

Briefly, the present invention is concerned with a selector switch, a multiple tie rod fastener, and a mounting bracket. The multiple tie rod fastener is employed for securing at least one and preferably a plurality of components, e.g., a plurality of wafer switch assemblies, onto a pair of tie rods extending from a wall or the like. In one instance, the multiple tie rod fastener is employed for securing a plurality of spaced wafer switch assemblies onto a pair of tie rods extending from a mounting bracket. The multiple tie rod fastener comprises a central portion of sheet metal and a pair of securing or end members integrally attached thereto. Each of the end members is provided with an aperture for receiving a tie rod. The end members are so orientated with respect to the central spring portion of the fastener that prior to assembling the multiple tie rod fastener onto a pair of tie rods each of the end members is disposed at an angle slightly less than 90° with respect to the axis of each of the tie rods. By forcing the end members of the multiple tie rod fastener onto the tie rods, the end members are biased into a plane substantially normal to the axis of the tie rods. Upon releasing the force, the inner portions of the apertures of each of the end members bite into and grip the tie rods and, accordingly, firmly hold the wafer switch assemblies onto the tie rod.

When necessary, the central portion of the tie rod fastener is designed to accommodate an apparatus such as a variable resistor. Thus, it is merely necessary to secure the apparatus rigidly onto the central portion of the multiple tie rod fastener and then assemble the multiple tie rod fastener onto the ends of the tie rods. In a preferred form of the invention, each of the apertures is provided with a plurality of inwardly extending teeth, the teeth in each of the end members being formed to generate a spiral whenever it is desirable to disassemble one of the tie rods from the multiple tie rod fastener by rotation of the former.

For a better understanding of the present invention, reference may be had to the accompanying drawings wherein the same reference numerals have been applied to like parts and wherein.

Figure 1:
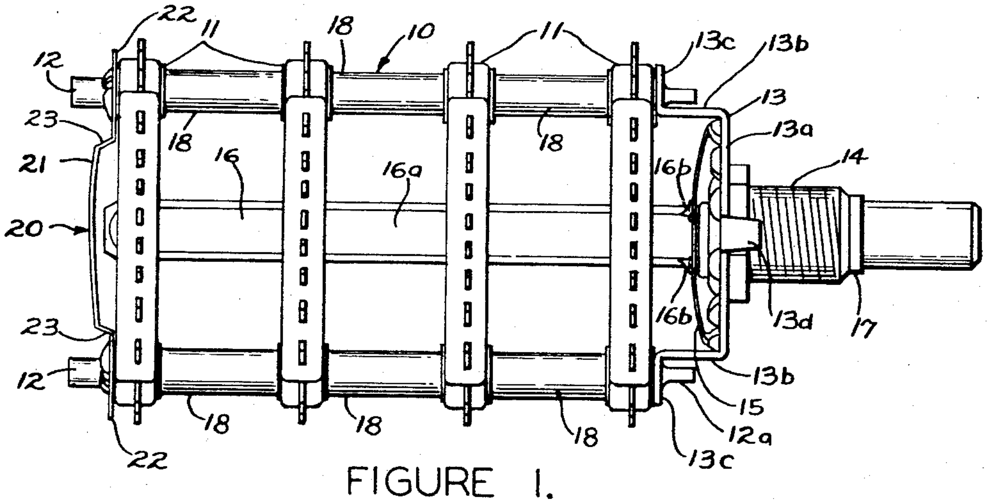
FIGURE 1 is a side view of a selector switch employing a multiple tie rod fastener.

Referring now to the drawings and preferably to FIGURE 1 thereof, there is illustrated a multi-position or selector switch, generally indicated at 10, comprising a plurality of wafer switch assemblies 11 fixedly secured in spaced relationship onto a pair of tie rods or studs 12 by a multiple tie rod fastener 20. It is to be understood, however, that various other components, e.g., an on-off switch, may also be assembled onto a pair of tie rods and fixedly secured thereon by the multiple tie rod fastener.

Considering first the selector switch 10, it comprises a front end bracket 13 of general configuration. The end bracket 13 comprises a central portion **13*a* provided with a centrally located aperture for receiving a bushing 14. Preferably, the bushing 14 is provided with an external thread for fixedly securing the selector switch 10 to a not shown panel with a suitable threaded nut. The front end bracket 13 generally is referred to as a detent bracket inasmuch as it supports a detent assembly 15 for selectively positioning the rotor contacts 11*a* (see FIGURE 2) of each of the wafer switch assemblies 11 with respect to the stator contacts 11*b* thereof. In order to space the detent assembly 15 from the wafer switch assembly 11 immediately adjacent thereto, the detent bracket 13 is provided with a pair of lateral extensions or legs 13*b* having a pair of feet 13*c* extending outwardly of the lateral extensions 13*b* to provide a supporting surface for the wafer switch assemblies 11. Each of the feet 13*c* is provided with an aperture for receiving one end of each of the tie rods 12, the end of the tie rod 12 adjacent to the aperture in each of the feet 13*b* of the detent bracket 13 being swaged in order to limit in one direction the axial movement of the tie rod with respect to the detent bracket. An ear 13*d* extending normal to the central portion 13*a* of the detent bracket 13 engages a slot in a not shown panel and fixedly secures the angular position of switch 10** with respect to the panel.

Figures 2, 3, 4, 5, 6:
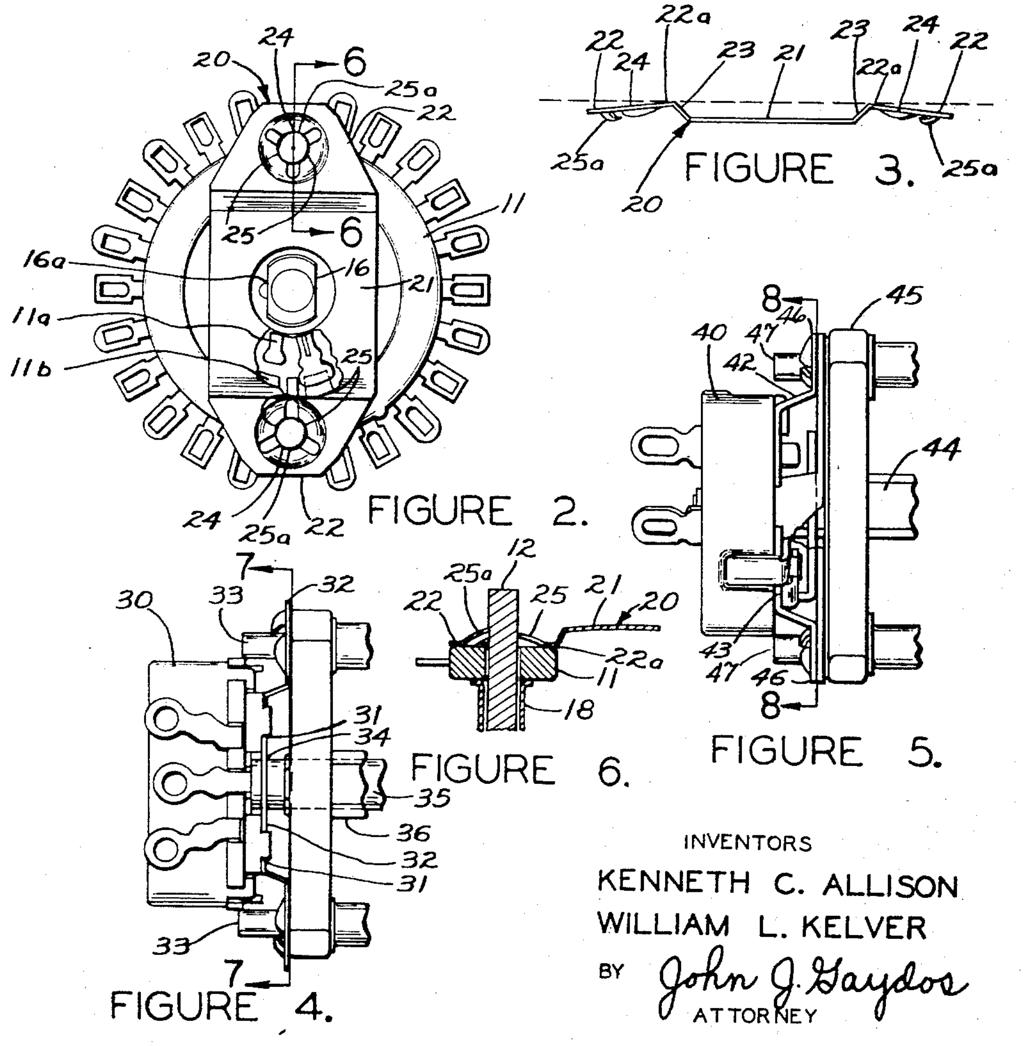
FIGURE 2 is a rear view of the selector switch of FIGURE 1, a portion of the fastener being removed to show the contacts of the switch.
FIGURE 3 is a side view of a multiple tie rod fastener.
FIGURE 4 is a fragmentary view of the rear portion of a selector switch employing a multiple tie rod fastener having an electrical control fixedly secured to the central portions of the fastener.
FIGURE 5 is a fragmentary view of the rear portion of a selector switch assembly employing a tie rod fastener having an on-off switch fixedly secured to the fastener.
FIGURE 6 is a fragmentary section taken along line 6—6 of FIGURE 2.
Figure 7:
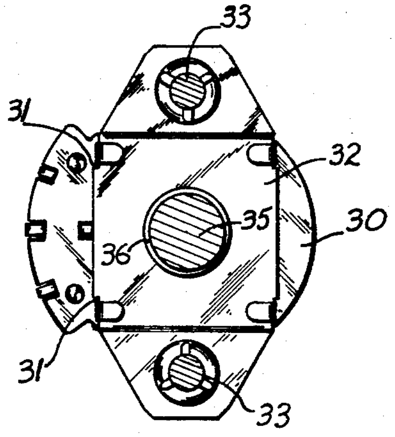
FIGURE 7 is a sectional view taken along the lines 7—7 of FIGURE 4 showing the control secured to the fastener.
Figure 8:
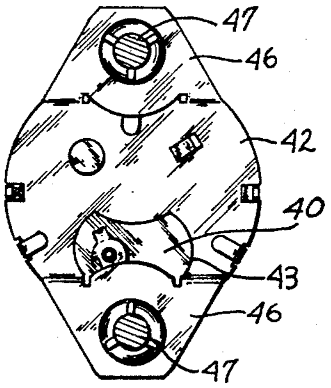
FIGURE 8 is a sectional view taken along the lines 8—8 of FIGURE 5 showing the switch secured to the fastener.

As best shown in FIGURE 2 of the drawings, an elongated shaft 16 provided with a pair of flats **16*a* inwardly of the detent bracket is employed for rotating the rotors of each of the wafer switch assemblies 11. One end of the shaft 16 is journaled in the bushing 14, and a C washer 17 fitted into a circumferential groove of the shaft 16 prevents the shaft from shifting inwardly or to the left as shown in FIGURE 1 of the drawings. To prevent the shaft from shifting outwardly of the bushing 14, portions 16*b* of the shaft 16 adjacent to the detent bracket 13 are crimped. Thus, with this arrangement, the longitudinal movement of the shaft is restricted with respect to the bushing 14 and the detent bracket 13**.

Inasmuch as the novel features of the invention do not reside in the wafer switch assemblies 11, additional details thereof are not being included herein. For further details, reference may be had to a selector switch shown in United States Patent of Allison No. 2,988,606, dated June 13, 1961 and in Allison copending application, Ser. No. 5,686, now Patent No. 3,219,785 filed Feb. 1, 1960, both the patent and the application being assigned to the same assignee as the present invention.

As shown in FIGURE 1 of the drawings, one or more wafer switch assemblies 11 are assembled onto the tie rods in spaced parallel relationship, the spacing being obtained by assembling tubular spacers 18 between adjacent wafer switch assemblies. If preferable, the tubular spacers 18 may be deleted and the wafer switch assemblies 11 may be stacked on the tie rods 12 in side by side relationship.

After the last wafer switch assembly 11 is assembled onto the tie rods 12, means must be employed for fixedly securing the wafer switch assemblies 11 thereonto. In accord with the present invention, the multiple tie rod fastener 20 is assembled onto the ends of the tie rods in a simple and facile manner without spiraling the individual wafer switch assemblies as is usually done when a threaded nut is employed for fixedly securing the wafer switch assemblies onto a pair of threaded screws extending from the detent bracket.

As best seen in FIGURES 1, 2, and 3 of the drawings, the multiple tie rod fastener 20 comprises a sheet metal central or main portion 21 having a pair of sheet metal end members 22 integrally secured thereto. It is to be understood, however, that the number of end members integrally secured to the central portion may be increased or decreased. If only one end member is employed, then one end of the central portion is merely fixedly secured so as to be the equivalent of a second end member. If three end members are employed, then the end members are equally spaced around the central portion. In a preferred form of the invention, the end members 22 lie in a plane in spaced relationship to the major plane of the central portion 21 to prevent the use of spacers or washers intermediate the multiple tie rod fastener 20 and the adjacent wafer switch assembly 11. Thus, the number of parts for assembling the selector switch 10 is reduced and the major plane of the central portion 21 of the multiple tie rod fastener 20 is properly spaced from the rotor contacts **11*a* so as not to interfere with the rotation of the rotor in the last wafer switch assembly. As illustrated in FIGURES 1 and 3 of the drawings, the central portion 21 is provided with a short substantially lateral extension 23 for integrally securing each of the end members 22 to the central portion 21**.

It must be appreciated that the multiple tie rod fastener 20 fixedly securing the wafer switch assemblies onto the tie rods 12 also is provided with means for applying sufficient force against the wafer switch assemblies to prevent spiraling of the assemblies during operation of the selector switch in order to avoid misalignment of the contacts of one of the wafer switch assemblies with respect to the other. To this end, the major plane of each of the end members 22 of the multiple tie rod fastener 20, while unassembled, forms a small angle with respect to a plane normal to the axis of the tie rods. In other words, as best illustrated in FIGURE 3 of the drawings, each of the end members 22 is obliquely disposed and forms an angle of approximately 4° with respect to a plane in spaced parallel relationship to the major plane of the unbowed central portion 21. This spaced parallel plane is schematically represented by a dashed line in FIGURE 3. It is to be understood, however, that the end members 22 may form a positive or negative angle with respect to the plane, i.e., the end members may be angled upwardly or downwardly as well as inwardly or outwardly of the central portion 21 of the multiple tie rod fastener 20. When the end members extend inwardly of the central portion, then corresponding openings are usually provided in the central member for receiving the tie rods.

In order to assemble the multiple tie rod fastener 20 onto the pair of tie rods 12, each of the end members 22 is provided with an aperture 24. As best illustrated in FIGURE 2 of the drawings, a plurality of teeth 25 extends inwardly of each of the apertures 24. Preferably each of the teeth 25 associated with one aperture is disposed in different planes and is formed at an angle so as to generate the path of a spiral. Thus, after the multiple tie rod fastener 20 is assembled onto the ends of the tie rods 12, the selector switch 10 may be disassembled by rotating the swaged heads of the tie rods, the effect thereof generating a spiral into the distal end of the tie rod. It is to be understood, however, that other types of aperture designs may be employed for receiving the tie rods 12. For example, the aperture may be elliptical and receivable by a circular tie rod or vice versa.

Upon assembling the tie rod fastener onto the tie rods, it is merely necessary to apply a force substantially normal to the end members 22 with a suitable tool thus forcing the end members 22 into a plane normal to the longitudinal axis of the tie rods 12. As best shown in FIGURES 1 and 6 of the drawings, the application of the force onto the end members 22 causes the central member 21 to bow slightly. In effect, the force flattens the end members 22 against the surface of the stator 11 of the wafer switch assembly, each of the end members pivoting about an axis formed at the junction of the end member and the lateral extension. When the tool forcing the multiple tie rod fastener is removed, the bowed central portion 21 biases the outer ends of the end members 22 toward the free ends of the tie rods causing the teeth 25 of the end members 22 to grip each of the tie rods 12. As soon as the teeth 25 grip each of the tie rods 12, the outer tooth 25*a* becomes fixed with respect to the associated tie rod 12 (see FIGURE 6) urging the end members 22 to pivot at a point or between the distal end of the outer tooth 25*a* and the tie rod, the point becoming a fulcrum. Thus, the pivoting action of the end members 22 about the fulcrum substantially increases the force at the inner end 22*a* of each of the end members 22 and, accordingly, maintains the wafer switch assemblies fixedly secured on the tie rods 12 after the force assembling the fastener thereonto is released.

For certain applications, it is desirable to mount an electronic control onto the end of a selector switch. For example, the electronic control may comprise a variable resistor 30 as shown in FIGURE 4 of the drawings. By providing suitable notches 31 in the outer edges of the central portion of a multiple tie rod fastener 32 employed for fixedly securing a plurality of wafer switch assemblies onto a pair of tie rods 33, the variable resistor 30 may be mounted onto the fastener in a simple and facile manner before or after the fastener 32 is assembled onto the tie rods. With this arrangement, it is possible to select the proper angular positions of the rotors of the individual wafer switch assemblies by selectively rotating a tubular shaft 36 and simultaneously vary the resistance of the variable resistor 30 by rotating an inner shaft 35 disposed within the tubular shaft 36. When the multiple tie rod fastener 32, generally referred to as a multiple tie rod fastener and mounting bracket, is employed for supporting an electronic control, e.g., a variable resistor, the central portion of the multiple tie rod fastener and mounting bracket 32 is provided with an aperture 34 slightly larger than the diameter of the shaft 35. Thus, the shaft can rotate freely in the aperture 34 of the multiple tie rod fastener and mounting bracket 32 and engage a suitable not shown driver or the like carrying a contact finger in the variable resistor 30.

Another embodiment illustrated in FIGURE 5 of the drawings is substantially identical to the embodiment shown in FIGURE 4. The only exception is that instead of mounting an electronic control onto the central portion of a multiple tie rod fastener and mounting bracket, an on-off switch 40 is mounted onto the central portion of the bracket 42, and a section of the central portion of the fastener is removed to provide adequate space for a bell crank 43 operatively connected to the switch 40 and to the end of a shaft 44. The bracket 42 provided with apertured end members 46 is mounted on a pair of spaced tie rods 47. Thus, by rotating the shaft 44 of the selector switch 45 from an initial position, not only are the rotors of the wafer switch assembly repositioned to alter the circuit, but a switch 40 is employed to energize or deenergize the equipment incorporating the selector switch 45.

From the above description, it is apparent that an improved selector switch and a very simple and inexpensive multiple tie rod fastener and/or mounting bracket has been provided for fixedly securing a plurality of wafer switch assemblies onto a pair of tie rods extending from a detent bracket. Moreover, various types of electronic controls, e.g., a variable resistor, a potentiometer and the like as well as a switch such as a single or double pole on-off switch, may be mounted onto the central portion of the tie rod fastener and mounting bracket.

Figure 9:
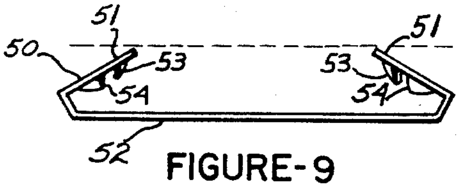
FIGURE 9 is a side view of another embodiment of the present invention.

Still another embodiment of a tie rod fastener 50 is shown in FIGURE 9 of the drawings. The fastener 50 is similar to the fastener 20 except that the end members are reversely bent toward each other and suitable openings are provided in the center portion 52 for receiving tie rods engaged by the teeth 53 extending inwardly of apertures 54 provided in the end members 51.

In FIGURE 9, as in FIGURE 3, a dashed line schematically represents a plane in spaced parallel relation to the central or center portion 52 of the fastener 50.

The operation of the present invention will readily be understood, in view of the detailed description included above, and no further discussion is included herewith. It will be appreciated that by employing a multiple tie rod fastener, the stability of a selector switch is increased and, by employing tie rods or unthreaded studs, the diameter of the supporting rods may be decreased thus increasing the electrical clearance between each of the tie rods and the adjacent contacts of the selector switch.

While there has been illustrated and described what is at present considered to be a preferred embodiment of the present invention and various modifications thereof, it will be appreciated that numerous changes and modifications are likely to occur to those skilled in the art, and it is intended in the appended claims to cover all those changes and modifications falling within the true spirit and scope of the present invention.

What is claimed as new and desired to be secured by Letters Patent of the United States is:

1. In a multiple tie rod fastener, the combination of a substantially planar central portion, a pair of substantially planar end members each integrally secured to one of a pair of extension members, said extension members being integrally secured to the central portion, the end members lying in a plane forming an acute angle with a plane in spaced parallel relation to the central portion, each of the end members being provided with an aperture for receiving an unthreaded member, means integrally secured to the peripheral edge of each of the apertures and having a helical edge portion, said means extending inwardly thereof for engaging the unthreaded members whereby upon assembling the fastener onto the pair of unthreaded members the angle between each of the end portions and the central portion is decreased for urging the means of each of the apertures into engagement with the associated unthreaded member, said helical edge portions and extension members projecting from respective ones of the end portions in a direction away from said plane and toward the central portion.

2. In a multiple tie rod fastener, the combination of a substantially planar sheet metal central portion, a pair of substantially planar end members each fixedly secured to one of a pair of extension members, said extension members being fixedly secured to the central portion and lying in a plane forming an acute angle with a plane in spaced parallel relation to the central portion, each of the end members being provided with an aperture adapted to receive an unthreaded tie rod, and a plurality of means integrally secured to the peripheral edge of each of the apertures and extending inwardly of the apertures, the means being adapted to grip the tie rods when the end members are forced into normal alignment with the axes of the tie rods, the last mentioned means and the extension members projecting from respective ones of the end portions in a direction away from said plane and toward the central portion.

References Cited

UNITED STATES PATENTS

| | | | |
|---|---|---|---|
| 2,342,690 | 2/1944 | Place | 85—36 |
| 2,382,520 | 8/1945 | Tinnerman | 85—36 |
| Re. 22,659 | 8/1945 | Tinnerman | 85—36 |
| 2,157,641 | 5/1939 | Tinnerman | 85—32 |
| 2,329,158 | 9/1943 | Gill | 85—32 |
| 2,754,717 | 7/1956 | Becker | 85—36 |
| 2,781,686 | 2/1957 | Boyd | 85—36 |
| 3,086,421 | 4/1963 | Hamman | 85—32 |

FOREIGN PATENTS

| | | |
|---|---|---|
| 239,143 | 2/1960 | Australia. |

EDWARD C. ALLEN, *Primary Examiner.*

U.S. Cl. X.R.

307—88; 317—258; 324—60; 338—32